(12) United States Patent
Stieff et al.

(10) Patent No.: US 9,448,138 B2
(45) Date of Patent: Sep. 20, 2016

(54) METHOD AND APPARATUS FOR AUTOMATION OF VEHICLE WHEEL ALIGNMENT MEASUREMENTS

(71) Applicant: Hunter Engineering Company, Bridgeton, MO (US)

(72) Inventors: Michael T. Stieff, Wentzville, MO (US); Blackford F. Brauer, St. Louis, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 543 days.

(21) Appl. No.: 13/749,328

(22) Filed: Jan. 24, 2013

(65) Prior Publication Data

US 2013/0132027 A1 May 23, 2013

Related U.S. Application Data

(63) Continuation of application No. 12/783,192, filed on May 19, 2010, now Pat. No. 8,457,925.

(60) Provisional application No. 61/179,487, filed on May 19, 2009.

(51) Int. Cl.
| | |
|---|---|
| G01N 1/00 | (2006.01) |
| G06F 17/00 | (2006.01) |
| G01B 21/26 | (2006.01) |
| G01M 17/013 | (2006.01) |

(52) U.S. Cl.
CPC ............ G01M 17/013 (2013.01); G01B 21/26 (2013.01); G06F 17/00 (2013.01)

(58) Field of Classification Search
CPC ..... G01M 17/013; G01B 21/26; G06F 17/00
See application file for complete search history.

(56) References Cited

U.S. PATENT DOCUMENTS

| | | | |
|---|---|---|---|
| 3,004,631 A * | 10/1961 | Clarke | ......................... 187/216 |
| 3,190,395 A | 6/1965 | Lill | |
| 6,219,134 B1 | 4/2001 | Voeller et al. | |
| 6,658,749 B2 | 12/2003 | Jackson | |
| 6,766,229 B2 | 7/2004 | Dry et al. | |
| 7,308,971 B2 | 12/2007 | Liebetreu et al. | |
| 7,908,976 B2 | 3/2011 | Pujol | |
| 2002/0026880 A1* | 3/2002 | Henderson | ............... B60P 1/43 |
| | | | 104/242 |
| 2002/0144414 A1* | 10/2002 | Jackson et al. | ............ 33/203.12 |
| 2006/0043350 A1* | 3/2006 | Branstetter | ..................... 254/88 |
| 2009/0056152 A1* | 3/2009 | Rogers | ...................... 33/203.18 |

FOREIGN PATENT DOCUMENTS

GB 2386352 A 9/2003

* cited by examiner

*Primary Examiner* — Alexander Satanovsky
(74) *Attorney, Agent, or Firm* — Polster, Lieder, Woodruff & Lucchesi, LC

(57) ABSTRACT

Methods and apparatus for a vehicle wheel alignment service procedure and an for acquisition of vehicle measurements, which imparts a gravity-induced rolling movement to a vehicle on a vehicle support structure to transition the vehicle from a first vehicle support surface over a descending roll ramp to a resting position on a second vehicle support surface.

12 Claims, 9 Drawing Sheets

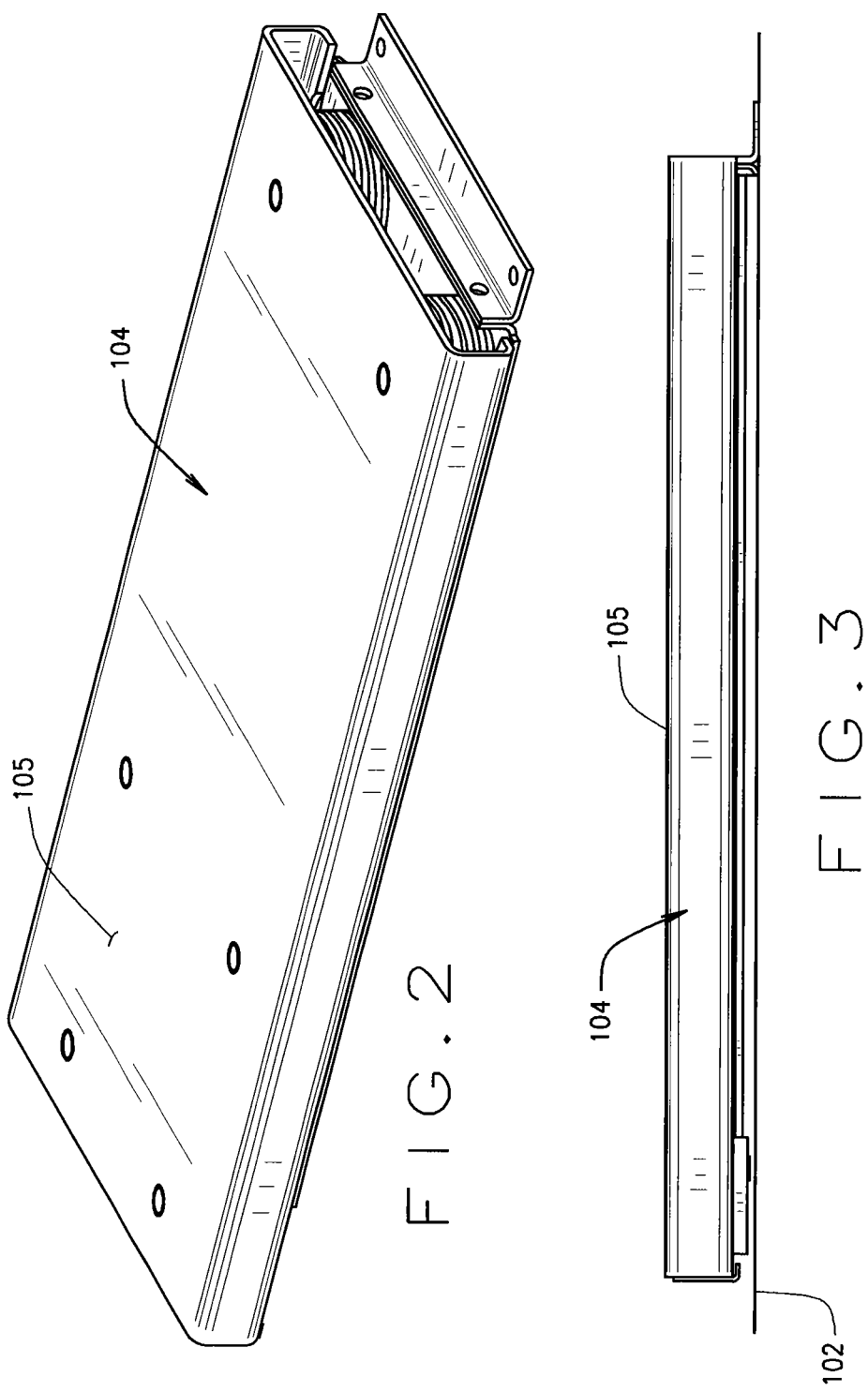

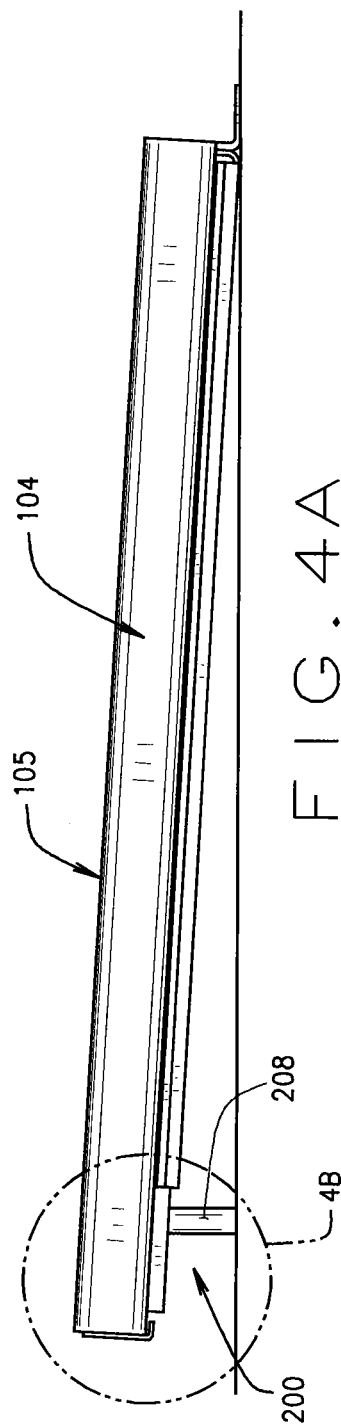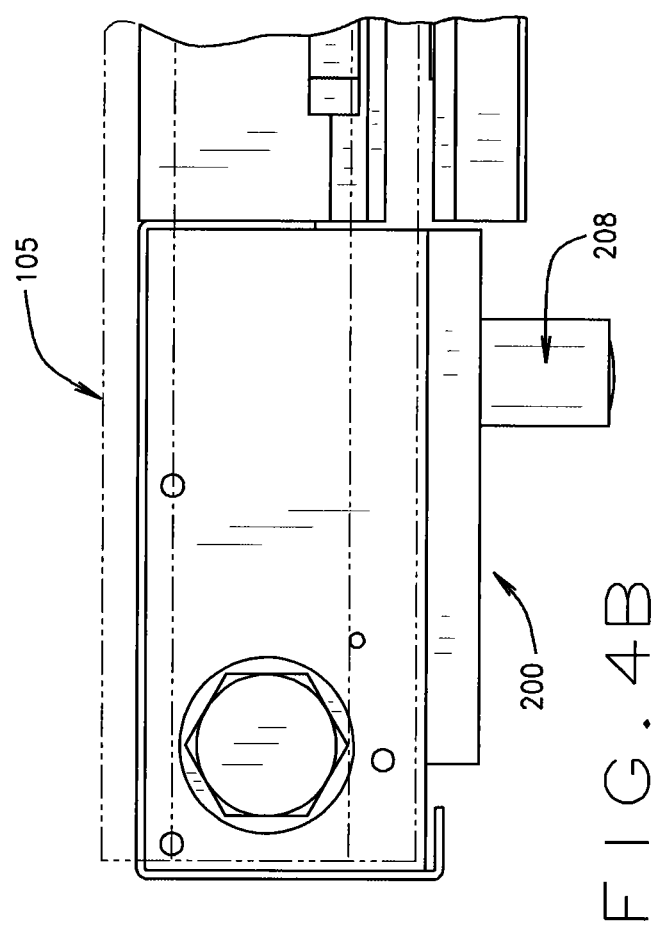

METHOD AND APPARATUS FOR AUTOMATION OF VEHICLE WHEEL ALIGNMENT MEASUREMENTS

CROSS-REFERENCE TO RELATED APPLICATIONS

The present application is a continuation of U.S. patent application Ser. No. 12/783,192 filed on May 19, 2010, now U.S. Pat. No. 8,457,925, which in turn is related to, and claims priority from, U.S. Provisional Patent Application Ser. No. 61/179,487 filed on May 19, 2009, both of which are herein incorporated by reference.

STATEMENT REGARDING FEDERALLY SPONSORED RESEARCH

Not applicable.

BACKGROUND OF THE INVENTION

The present disclosure is related generally to the measurement of vehicle wheel alignment values, and in particular, to methods and apparatus for automating procedures for obtaining measurements of vehicle wheel alignment, including rolling compensation and caster steering procedures.

When a vehicle is brought to a shop for a wheel alignment service, a number of preliminary procedures are required to be carried out prior to the actual adjustment of any wheel alignment angles. Many of these procedures are independent of the specific type or model of vehicle undergoing the wheel alignment service. For example, when a vehicle is brought into a service bay, alignment sensors or targets are typically attached to the vehicle wheels and compensated for any mounting misalignment from the rotational axis of each wheel. Traditionally, a rolling compensation procedure is carried out after the sensors or targets are mounted to the vehicle wheels, wherein a technician manually pushes or pulls the vehicle to induce a rolling movement of the vehicle over a short distance. By monitoring the translational and rotational movement of the sensors or targets attached to the wheels, the vehicle wheel alignment system determines any necessary compensation values which will be used in any subsequent procedures associated with the vehicle wheel alignment service. Manually imparting the necessary rolling movement to the vehicle by a technician risks serious injury. If the vehicle is heavy or has a high rolling resistance, the technician may be required to exert a significant push to the vehicle, risking personal injury. Correspondingly, if the vehicle is of a lighter weight, or quickly overcomes any rolling resistance, too much exerted force could potentially cause the vehicle to roll too far, or even off of a lift rack on which it may be resting, resulting in damage to the vehicle and risk of injury to bystanders.

A second procedure which is often carried out prior to actual adjustment of any wheel alignment angles is the caster steer procedure, which facilitates calculation of a steered wheel's caster angle based on either changes in the camber angle of the steered wheel or, for machine-vision based alignment systems, from a minimum of two different images of the wheel or target as the toe angle of the wheel changes during steering movement. Typically, during a vehicle wheel alignment adjustment service procedure, any steering angle changes are made by turning the vehicle steering wheel from the driver's seat position, and not by turning the vehicle wheels directly, resulting in lost time to complete the alignment adjustment procedure, additional physical effort, and an inconvenience to the alignment technician who is required to reach into or climb in and out of the vehicle. Furthermore, for some wheel alignment angle adjustments, the operator is required to initially steer the vehicle wheels to a straight ahead position, or to another selected position, from the driver's seat, make the necessary adjustments, causing the steered location of the vehicle wheels to change, and then return to the driver's seat to steer the wheels back to the selected position to continue making adjustments of the alignment angles. This time consuming process may be repeated several times to verify the adjustments of the alignment angles results in the alignment angles being within specification.

Accordingly, in order to automate and expedite a vehicle wheel alignment service procedure for a vehicle, it would be advantageous to provide a means by which a number of the common and generic procedures may be automatically carried out by the vehicle wheel alignment service system. In particular, it would be advantageous to provide a mechanism to automating the rolling movement of a vehicle required to complete the rolling compensation procedures, to provide a mechanism for automating the steering movement of the steered vehicle wheels required to complete the caster steer procedures, as well as other procedures which require steered movement of the wheels.

BRIEF SUMMARY OF THE INVENTION

Briefly stated, the present disclosure provides methods and apparatus for automating various preliminary and non-vehicle specific steps during a vehicle wheel alignment service procedure.

In one embodiment, the present disclosure provides a method and apparatus for automating vehicle rolling movement during a rolling compensation procedure of a vehicle wheel alignment service. During the vehicle wheel alignment service, the vehicle is driven onto, or position on, a supporting structure, such as a vehicle lift runway or measurement station. Within the supporting structure, an actuation mechanism under control of the vehicle wheel alignment service system is provided to enable the tilting elevation of a ramp segment beneath one or more of the vehicle wheels, causing the vehicle to roll forward a short distance in response to the force of gravity. The tilting elevation of the ramp segment may be controlled by a processing system of the vehicle wheel alignment service system to achieve a desired rate of rolling motion and/or desired distance of rolling motion. Either before and after, or during the rolling movement of the vehicle, the necessary measurements are obtained by the vehicle wheel alignment service system to complete the rolling compensation procedure. After the vehicle has rolled a desired amount, the elevated portion of the segment is lowered and returned to the initial horizontal position, generally coplanar with the supporting structure or floor.

In an alternate embodiment, the present disclosure provides a method and apparatus for facilitating a gravity-assisted vehicle rolling movement during a rolling compensation procedure of a vehicle wheel alignment service. During the vehicle wheel alignment service, the vehicle is driven onto, or positioned on, a supporting structure having integrated descending ramps and associated wheel stops. With the vehicle positioned adjacent the upper end of the descending ramp, an operator or an actuating mechanism imparts a small amount of forward movement to the vehicle, such as by pushing, to allow the force of gravity to roll one axle of the vehicle down the descending ramps towards the associated wheel stops. Either before and after, or during the rolling movement of the vehicle down the descending ramps, the necessary measurements are obtained by the vehicle wheel alignment service system to complete the rolling compensation procedure.

In a second embodiment, the present disclosure provides a method and apparatus for automating the steering movement of steered vehicle wheels during vehicle wheel alignment service procedures, such as caster steer, which require a range of steered wheel movement. During the vehicle wheel alignment service, the vehicle is driven onto, or position on, a supporting structure, such as a vehicle lift runway or measurement station. Within the supporting structure, turnplates are provided for the steerable wheels of the vehicle to rest upon. Each turnplate is mechanically configured to support the vehicle steered wheels, and to enable both rotational and translational movement of the wheels during steering motion. To automate the steering movement, an actuation mechanism under control of the vehicle wheel alignment service system is provided within at least one of the turnplates. The actuation mechanism is configured to rotate the turnplate in response to commands from the vehicle wheel alignment service system, effectively steering the vehicle is steered wheels through a desired steering movement, enabling the acquisition of required steered wheel measurements across the desired range of steering motion.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2 is a close perspective view of the lift ramp segment in FIG. 1;

FIG. 3 is a side plan view of the lift ramp segment of FIG. 2;

FIG. 4A is a side plan view of the lift ramp segment of FIG. 2 in an elevated position;

FIG. 4B is an enlarged side plan view of the internal lift assembly actuated to elevate the lift ramp segment of FIG. 4A;

Corresponding reference numerals indicate corresponding parts throughout the several figures of the drawings. It is to be understood that the drawings are for illustrating the concepts set forth in the present disclosure and are not to scale.

Figure 1A:
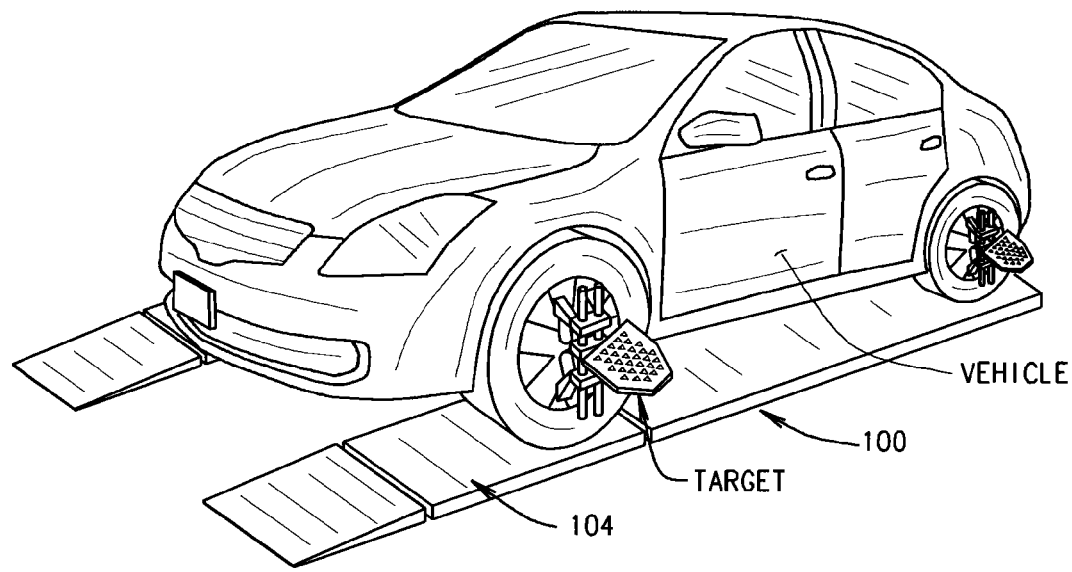
FIG. 1A is a perspective illustration of a vehicle disposed on a support structure incorporating a lift ramp segment of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1B:
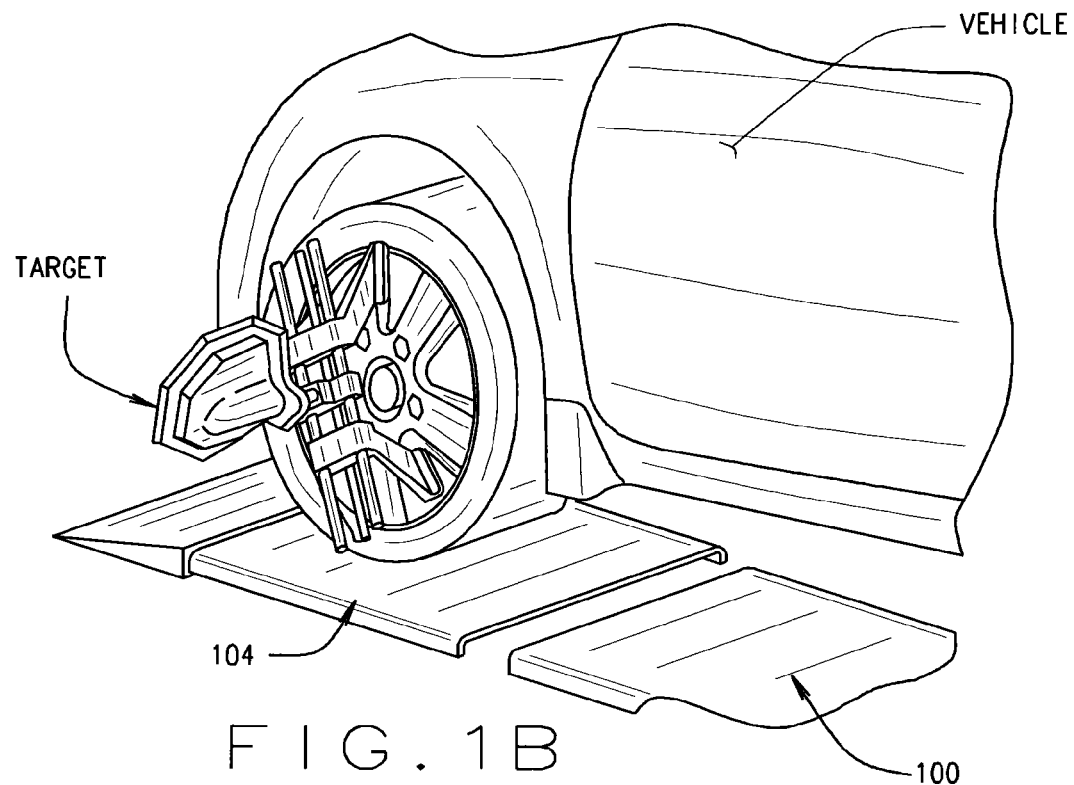
FIG. 1B is a perspective illustration of the vehicle of FIG. 1A rolling in response to a tilting elevation of a lift ramp segment.

The present disclosure provides a method and apparatus for automating a rolling movement of a vehicle during a rolling compensation procedure of a vehicle wheel alignment service. At the start of the vehicle wheel alignment service, the vehicle is driven onto, or position on, a supporting structure 100, such as a pair of vehicle support runways 102 associated with a vehicle lift or measurement station. One such vehicle support runway 102 is shown in FIGS. 1A and 1B. Within the support structure 100, an actuation mechanism 200 under control of a vehicle wheel alignment service system (not shown) is provided to enable inclination of the lift ramp segment 104 of the support runway 102 by the elevation of one end of a lift ramp segment 104 beneath one or more of the vehicle wheels (best seen in FIG. 1B), causing the vehicle to roll down the inclined lift ramp segment 104 a short distance along the support runway 102 in response to the force of gravity, without the need for the operator to manually push or pull the vehicle. The actuation mechanism 200 may be pneumatically operated, hydraulically operated, or mechanically driven, to elevate one end of the lift ramp segment 104 to a sufficient height to achieve the desired rolling movement of the vehicle. Preferably, the vehicle wheel alignment service system may be configured to selectively control the tilting elevation of the lift ramp segment 104 to achieve a desired rate of rolling movement, and/or a desired distance of rolling movement for the vehicle.

Figure 5:
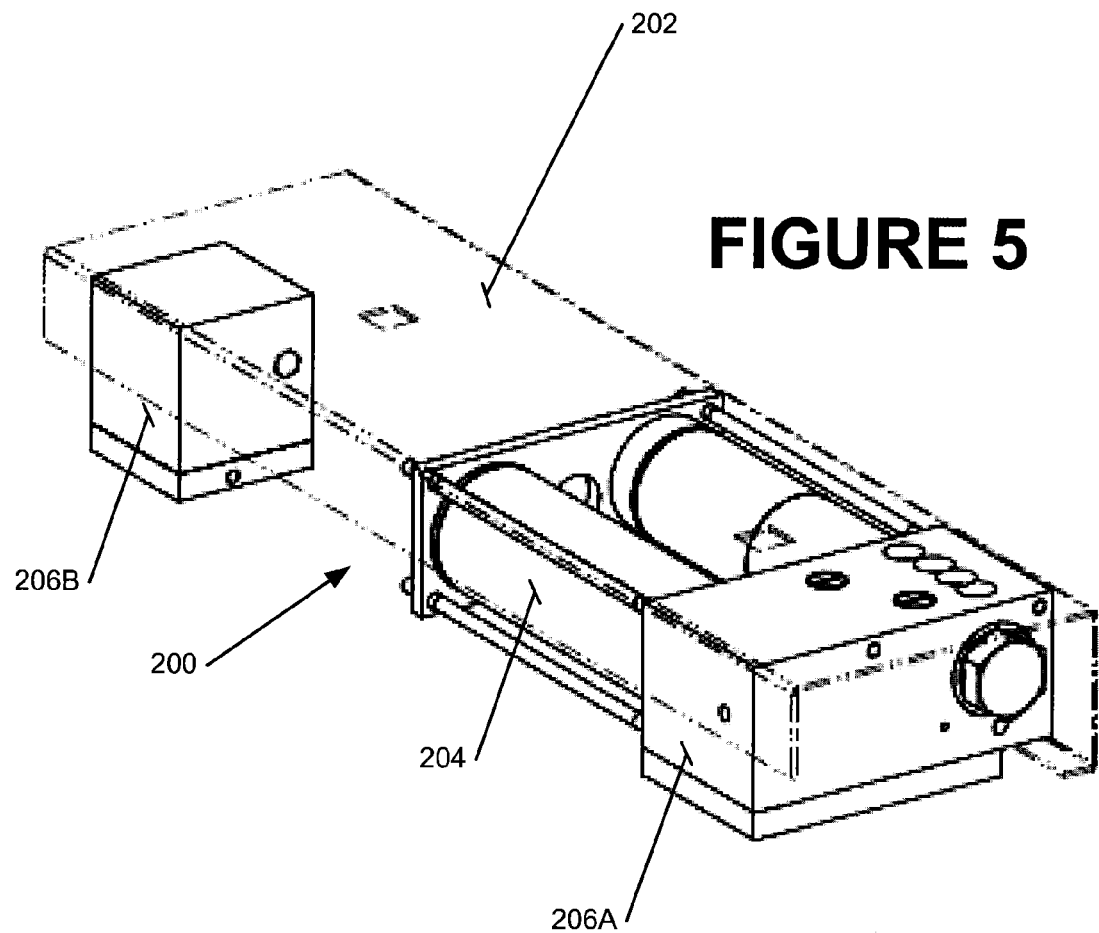
FIG. 5 is an enlarged perspective view of the internal lift assembly of FIG. 4B.

As seen in FIGS. 4A, 4B, and 5, an exemplary actuation mechanism 200 is disposed beneath the vehicle support surface 105 of the lift ramp segment 104, adjacent the end to be elevated. The actuation mechanism may be contained within a protective housing 202, and preferably includes a power unit 204 adapted to receive external commands, together with one or more cylinder assemblies 206A, 206B each containing an actuating piston 208. Each actuating piston 208 is driven by the associated cylinder assemblies to between a retracted position wherein the lift ramp segment 104 is disposed substantially level with respect to the vehicle support runway 102 (such as seen in FIG. 3), and an extended position wherein the extension of the actuating piston 208 inclines the lift ramp segment 104 with respect to the vehicle support runway 102 (such as seen in FIGS. 4A and 4B). Those of ordinary skill in the art will readily recognize that the specific configuration of the actuation mechanism 200 may be varied in accordance with the specific configuration of the vehicle supporting structure 100, and that any suitable actuation mechanism which can be controlled by external commands from a vehicle wheel alignment system or an operator to selectively incline the lift ramp segment 104 may be utilized within the scope of the present disclosure.

Before, during, and after the rolling movement of the vehicle down an inclined lift ramp segment 104, conventional measurements may be obtained by an associated vehicle wheel alignment service system (not shown) as required to complete a rolling compensation procedure using sensors (not shown) or optical targets as seen in FIGS. 1A and 1B, mounted to the individual wheels of the rolling vehicle. Once the vehicle has rolled to the desired position on the supporting structure 102, the inclined lift ramp segment 104 is lowered and returned to the initial horizontal position by the actuating mechanism 200, such that it is generally coplanar with the other vehicle support surfaces of the supporting structure 102. In one embodiment, the rolling movement and position of the vehicle wheel is monitored by the vehicle wheel alignment service system using the sensors or optical targets, and the actuating mechanism 200 is controlled by the vehicle wheel alignment service system using a feedback control circuit to achieve a desired rate of rolling movement and/or positioning of the vehicle wheel through controlled inclination of the lift ramp segment 104.

In addition to enabling rolling movement of the vehicle such as during a rolling compensation procedure, the actuation mechanisms 200 for the lift ramp segments 104 may be controlled by the operator or vehicle wheel alignment system to carry out vehicle service procedures or measurements other than rolling compensation. For example, with the weight of a vehicle supported above the runway surfaces 105 of the support structure 102 by a separate jacking mechanism (not shown), a vehicle service system may be configured to direct the actuating mechanism 200 to partially incline or elevate the lift ramp segments 104 to impart a vertical load to a supported vehicle wheel, without causing the wheel to roll, thereby enabling the vehicle service system to observe the responses of the vehicle wheel suspension components in both loaded and unloaded conditions. By monitoring the responses of the vehicle wheel suspension components to the imparted vertical loads, excessive play or looseness may be identified by the vehicle service system, and suitable messages for correction provided to an operator. Those of ordinary skill in the art will recognize that the present disclosure is not limited to a specific use of the disclosed lift ramp segments 104, and that there may be other operations and/or vehicle service procedures wherein it may be useful to impart a vertical load to one or more wheels of a supported vehicle. For example, it may be beneficial to impart a vertical load to a single wheel of a vehicle using the a single lift ramp segment 104 in order to compress a vehicle suspension member during removal or repair.

In one embodiment of the vehicle support structure 100 disclosed herein, after the vehicle is rolled forward by the tilting elevation of the lift ramp segment 104, the steered wheels of the vehicle will preferably come to rest on associated turnplates 110 within the support runway 102 or which are incorporated into the upper surface of the lift ramp segments 104 themselves. The turnplates 110 are adapted to enable automation of the steering movement of the steered vehicle wheels during vehicle wheel alignment service procedures, such as caster steer, which require a range of steered wheel movement. As shown in U.S. Pat. No. 7,308,971 B2 to Liebetreu et al., which is herein incorporated by reference, turnplates 110 are mechanically configured to support the vehicle steered wheels, and to enable both rotational and independent translational movement of the wheels during steering motion. By disassociating the rotational movement of the turnplate from the translational movement, the turnplate can accommodate offset positioning of the vehicle wheel from the turnplate rotational axis, as well as translational movement due to the Ackerman effect from the vehicle wheel suspension geometry.

To automate the steering movement, a turnplate actuation mechanism preferably under control of the vehicle wheel alignment service system, but optionally controlled by the operator, is provided within at least one of the turnplates 110, but preferably within both front turnplates (i.e. one for each steered wheel of the vehicle). The turnplate actuation mechanism may be pneumatically driven, hydraulically driven, or mechanically driven, and is configured to rotate each turnplate 110 in response to commands from the operator or vehicle wheel alignment service system, effectively steering the vehicle steered wheels through a range of desired steering movement. The turnplate actuation mechanism is configured to facilitate the acquisition of required steered wheel measurements across the desired range of steering motion without the need for the operator to manually move the steered vehicle wheels or to enter the vehicle and turn the steering wheel. In order to accommodate any misalignment between the rotational axis of the turnplates 110 and the steering axis of the steered vehicle wheel, the turnplate actuation mechanism for the rotational movement, and the upper surfaces of the turnplate 110 are configured for rotational movement independent from the translational movement of the turnplate 110, such that each vehicle steered wheel is permitted to freely move about a steering arc in response to the driven rotational movement from the turnplate 110.

During a vehicle wheel alignment service procedure which requires a steering movement of the vehicle wheels, such as a caster steer measurement procedure, the operator or the vehicle wheel alignment measurement system controls the operation of the turnplate actuation mechanism in the turnplates 110 to move the steered vehicle wheels supported on the turnplates 110 through the required range of steering motion, while acquiring the necessary measurements from the sensors associated with the wheels in a traditional manner. The measurements may be conventionally acquired during the steering movement, or the steering movement may be stopped by the vehicle wheel alignment service system at various rotational positions for stationary measurements to be obtained. The specific range of steering movement through which the steered wheels are driven by the turnplates 110 may be controlled by mechanical stops incorporated into the turnplate actuation mechanism, or may be regulated by the observation of targets and/or sensors associated with the steered vehicle wheels by the vehicle wheel alignment service system.

In addition to facilitating caster steering measurement procedures, those of ordinary skill will recognize that the actuated turnplates 110 of the present disclosure may be utilized by a vehicle wheel alignment service system to carry out a variety of vehicle wheel alignment and/or service procedures which require controlled steering movement of the vehicle steered wheels. For example, by controlling the turnplate actuation mechanisms in each turnplate assembly 110 independently, a vehicle wheel alignment service system may engage the turnplate assemblies 110 to automatically apply opposite rotational forces simultaneously to each steered wheel of a vehicle. By observing the resulting reactions in the vehicle steered wheels, looseness or play in the various vehicle suspension and steering system components may be identified, and suitable warning messages displayed to an operator indicating the need for vehicle repair or service.

Correspondingly, for some vehicle service procedures, the steered vehicle wheels are required to remain stationary, and should not be free for steering movement. In addition to driving the turnplate assemblies 110 through a range of steering movement, the turnplate actuation mechanisms under control of the vehicle wheel alignment service system may be utilized to hold or lock the turnplates 110 in a desired position, preventing unrestrained steering movement of the vehicle steered wheels during a vehicle service procedure or measurement process.

Those of ordinary skill in the art will recognize that not all vehicle support structures 100 will necessarily incorporate turnplate assemblies, such as the actuated turnplate assemblies 110. For example, a vehicle inspection center and/or quick-lube oil change center may not be configured to carry out full-service vehicle wheel alignment procedures which require full-range steering motion of the vehicle steerable wheels as provided by turnplate assemblies. However, the vehicle wheel alignment inspection procedures conducted by such facilities may require the steerable wheels to have at least a limited range of free motion during the vehicle wheel alignment service and/or inspection procedures. Accordingly, in one embodiment, the lift ramp segments 104 upon which the vehicle wheels are disposed may incorporate suitable support structures, as shown at FIGS. 6 and 7, to function additionally as locking slip-plates and to provide a limited range of free movement both laterally and transversely for a supported vehicle wheel.

Figure 6:
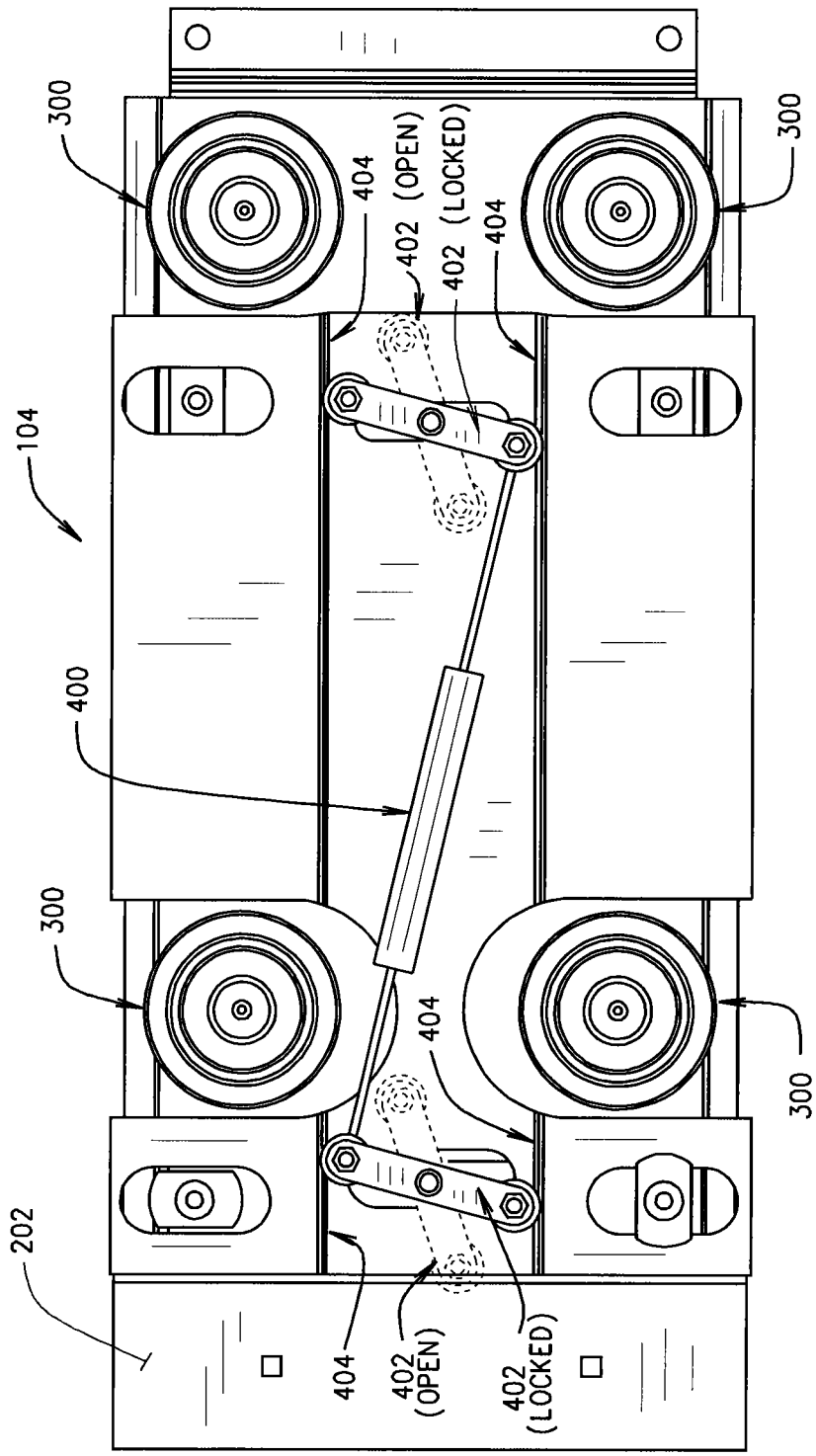
FIG. 6 is a top plan view of the lift ramp segment of FIG. 2, with the vehicle support surface removed.
Figure 7:
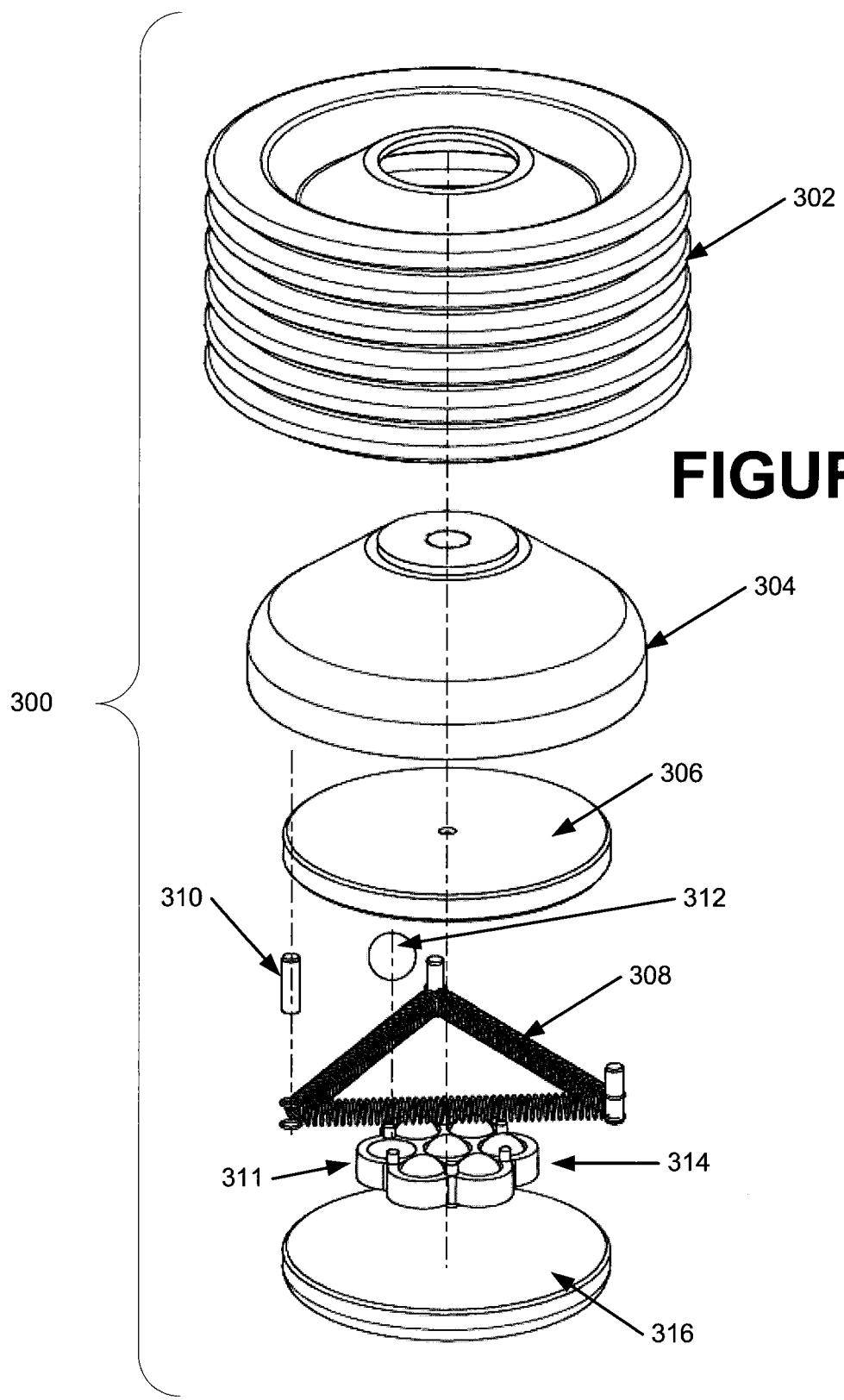
FIG. 7 is an exploded view of a vehicle support surface mounting pedestal assembly and sealed bearing of the lift ramp segment of FIG. 2.

To selectively permit free movement both laterally and transversely of the supported vehicle wheels, the vehicle support surface 105 of the lift ramp segments 104 is secured on an underside surface to accommodating mountings 300 and a locking mechanism 400, as best seen in FIG. 6. Preferably, the set of accommodating mountings 300 couple the vehicle support surface 105 to the internal structure of the lift ramp segment 104. Each accommodating mounting, as best see in FIG. 7, consists of a flexible protective bellows 302 which seals and encloses the components of the accommodating mounting 300. Within the protective bellows, an upper mount 304 couples the vehicle support surface 105 to an upper support plate 306. The upper support plate 306, in turn, rests on a ball bearing assembly 314 supported by a lower plate 316 coupled to the fixed structure of the lift ramp segment 104. The ball bearing assembly 314 contains a plurality of ball bearings 312 in a planar arrangement within a retaining cage 311. The ball bearing assembly 314 is permitted a limited range of motion within a horizontal plane between the upper and lower support plates 306, 316, and is restrained within a triad of extension springs 308 secured by dowel pins 310 to the lift ramp segment support structure. A centering force imparted on the ball bearing assembly 314 by the triad of extension springs 308 increases the further the ball bearing assembly moves off-center relative to the upper and lower support plates 306, 316, effectively biasing the ball bearing assembly towards a centered location. As can be appreciated by those skilled in the art, the vehicle support surface 105, coupled to the accommodating mountings 300 in an unlocked configuration, has a limited freedom of movement within the plane of the mountings 300 due to the ball bearing assemblies 314.

In order to prevent movement of the vehicle support surface 105, the locking mechanism 400 may be actuated, pivoting one or more engaging members 402 into contact with restraining surfaces 404 rigidly coupled to the vehicle support surface 105. The frictional engagement and contact forces between the engaging members 402, which are secured to the lift ramp segment support structure, and the restraining surfaces 404 secures the vehicle support surface 105 in a centered and locked position for so long as the locking mechanism 400 remains actuated. The locking mechanism 400 may be pneumatically operated, hydraulically operated, or mechanically operated in response to commands from an associated vehicle wheel alignment system, vehicle service console, or operator.

Those of ordinary skill in the art will readily recognize that the specific configuration and mechanism of either the accommodating mountings 300 or the locking mechanism 400 adapted to enable and control a limited range of movement for the vehicle support surface 105 of the lift ramp segments 104 may be varied from the specific configurations described herein and shown in the figures without departing from the scope of the present disclosure. For example, structures designed to accommodate vehicles of greater than average weight may require correspondingly greater numbers of accommodating mountings and/or different types of locking mechanisms, such as those set forth in U.S. Pat. No. 7,308,971 B2 to Liebetreu et al.

By integrating the various vehicle support structure embodiments of the present disclosure with a computerized vehicle wheel alignment system, it will be recognized that a high degree of automation may be achieved in the measurement and evaluation of a vehicle's wheel alignment settings. For example, a computerized vehicle wheel alignment system which is in communication with a vehicle support structure 100 incorporating actuated lift ramp segments 104 and/or actuated turnplate assemblies 110 can automate many wheel alignment data acquisition procedures which require rolling movement of the vehicle and/or steering movement of the vehicle's steered wheels.

Figure 10A:
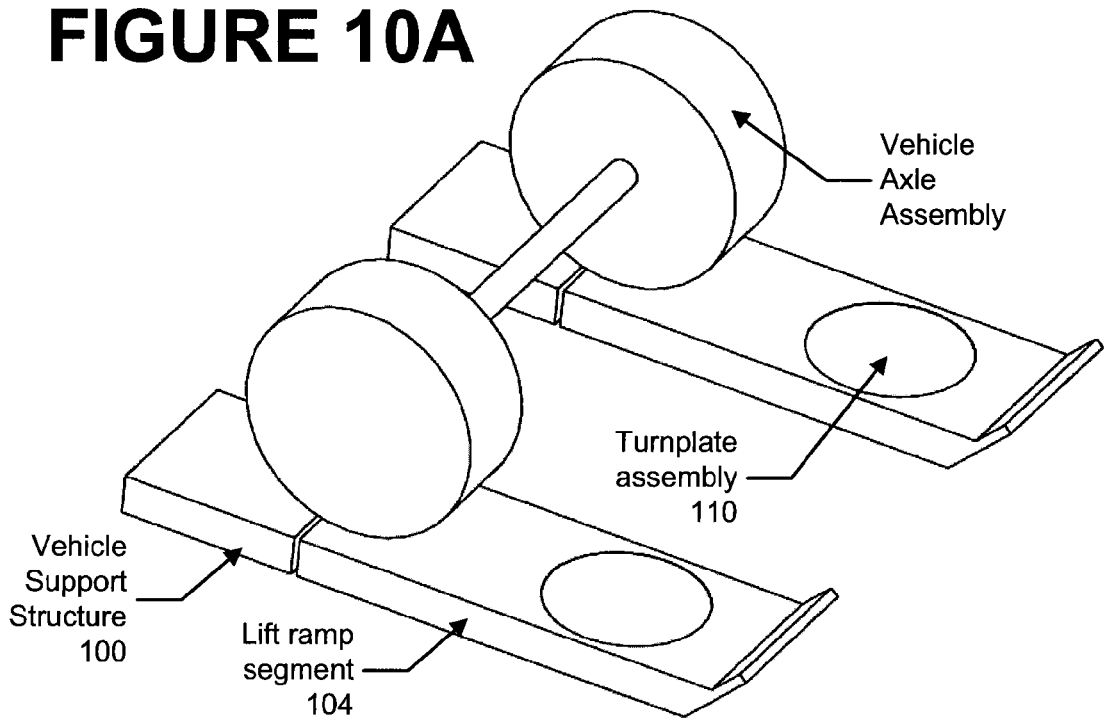
FIG. 10A-10D provide perspective illustrations the steps in a method of the present invention for utilizing the lift ramp segment of FIG. 2 to impart a rolling movement to a vehicle.

In an exemplary vehicle wheel alignment service process, illustrated in FIGS. 10A-10D, a vehicle is driven onto a vehicle support structure 100 of the present disclosure, and positioned with two wheels on the actuated lift ramp segments 104, as seen in FIG. 10A. The operator proceeds to install any required wheel alignment sensors or optical targets to the vehicle wheels, and optionally raise the vehicle support structure 100 to a service height. The action of raising the vehicle support structure 100 to the service height may be communicated to the vehicle wheel alignment system, and optionally initiate the start of the vehicle wheel alignment procedures by the vehicle wheel alignment service system, or the operator may provide the system with an indication to start, such as by providing a VIN number or other start indication. Alternatively, for a machine vision vehicle wheel alignment system, observation of the presence of one or more optical targets mounted to the vehicle wheels and positioned within a selected region in a camera field of view, such as by the lifting of the vehicle on a vehicle lift rack to a "service" or "working" height, may be used to initiate the start of the vehicle wheel alignment procedures.

Figure 10B:
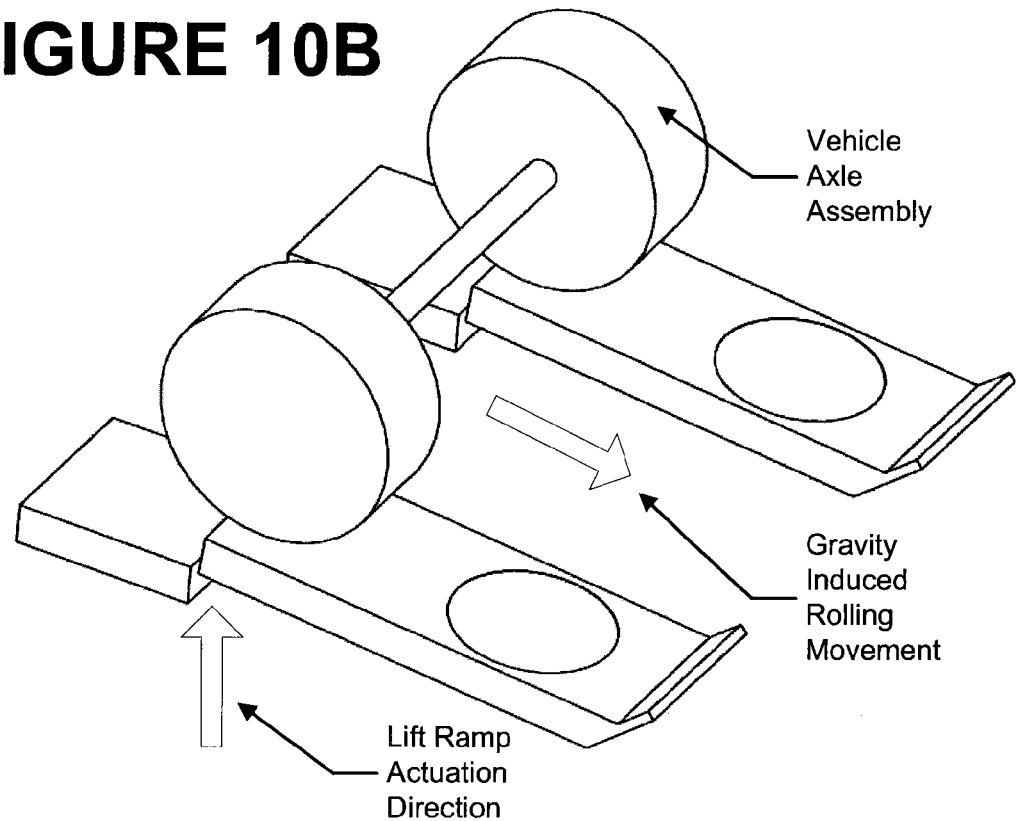
Figure 10C:
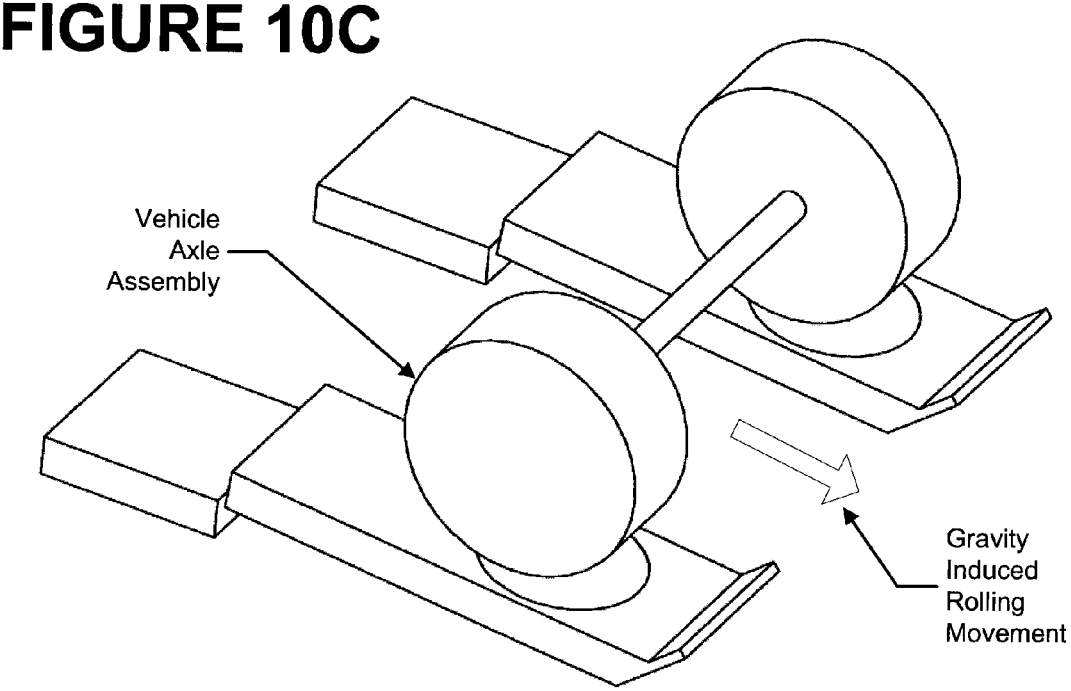
Figure 10D:
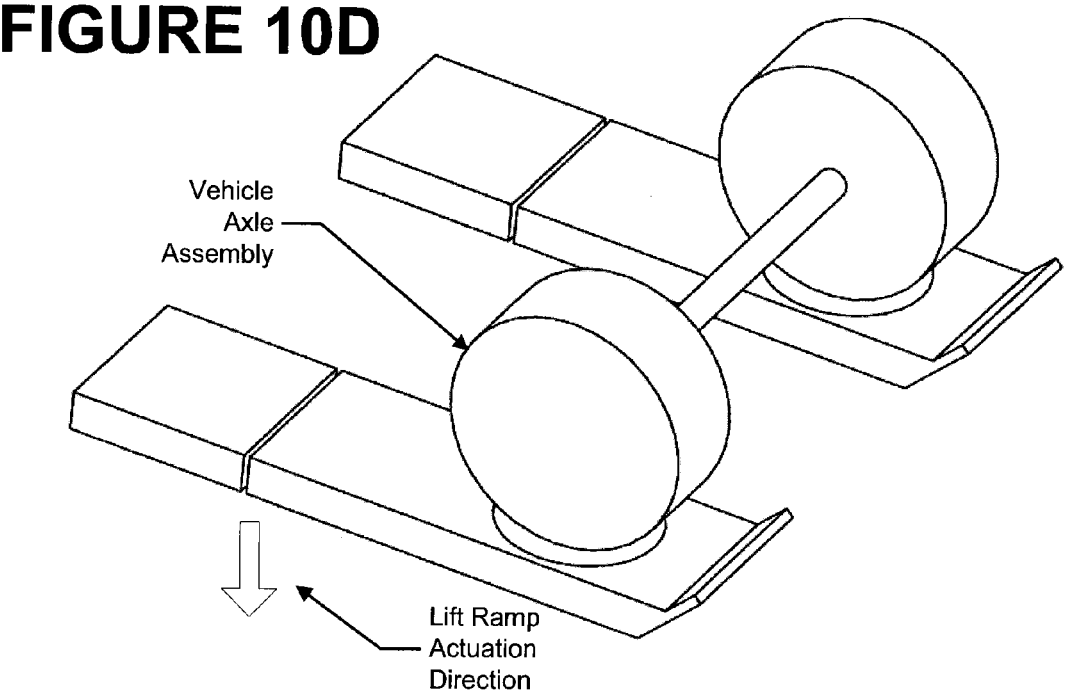

At this point, the vehicle wheel alignment service system may begin the service procedures by automatically conducting the required rolling compensation procedures to obtain the necessary sensor and/or target calibrations. The rolling compensation procedure is carried out automatically as the vehicle wheel alignment service system commands the actuated lift ramp segments 104 to incline above the horizontal surfaces of the vehicle support structure 100, imparting a controlled rolling movement to the vehicle in response to the force of gravity, as seen in FIG. 10B. Preferably, the inclination angle and duration of the inclination of the actuated lift ramp segment is controlled by the vehicle wheel alignment service system to impart a desired rate of rolling movement to the vehicle, and to ensure that the vehicle rolls a preferred distance along the lift ramp segment 104, coming to rest at a desired location, such as on an integrated turnplate assembly 110. As seen in FIG. 10C, the inclination of the lift ramp segment 104 rolls the vehicle such that the front steered wheels of the vehicle come to rest on the associated turnplate assemblies 110 (if present), at which point the lift ramp segment 104 is returned to the horizontal rest position (FIG. 10D), enabling the vehicle wheel alignment service system to continue with subsequent procedures, such as an automated caster steer measurement procedure.

For systems including actuated turnplate assemblies 110, the vehicle wheel alignment system is configured to direct the actuating mechanism in the turnplate assemblies 110 to rotate the steered vehicle wheels through a range of steering movement sufficient to obtain the required caster steer measurements from the associated sensors and/or optical targets on the steered vehicle wheels during an automated caster steer measurement procedure. Upon completion of the automated caster steer measurement procedures, the steered vehicle wheels are returned to the straight-ahead steered position by the wheel alignment system controlled-actuation of the turnplate assembly 110, and additional vehicle wheel alignment angle measurements such as toe, camber, and caster, are obtained as is conventional during a wheel alignment measurement procedure.

It will be readily recognized that by configuring a vehicle wheel alignment system to automate one or more of the measurement and compensation procedures required during a vehicle wheel alignment service procedure, through the use of actuated components on a vehicle support structure 100 such as lift ramp segments 104 or turnplates 110, improvements in measurement accuracy and efficiency may be obtained.

Figure 8:
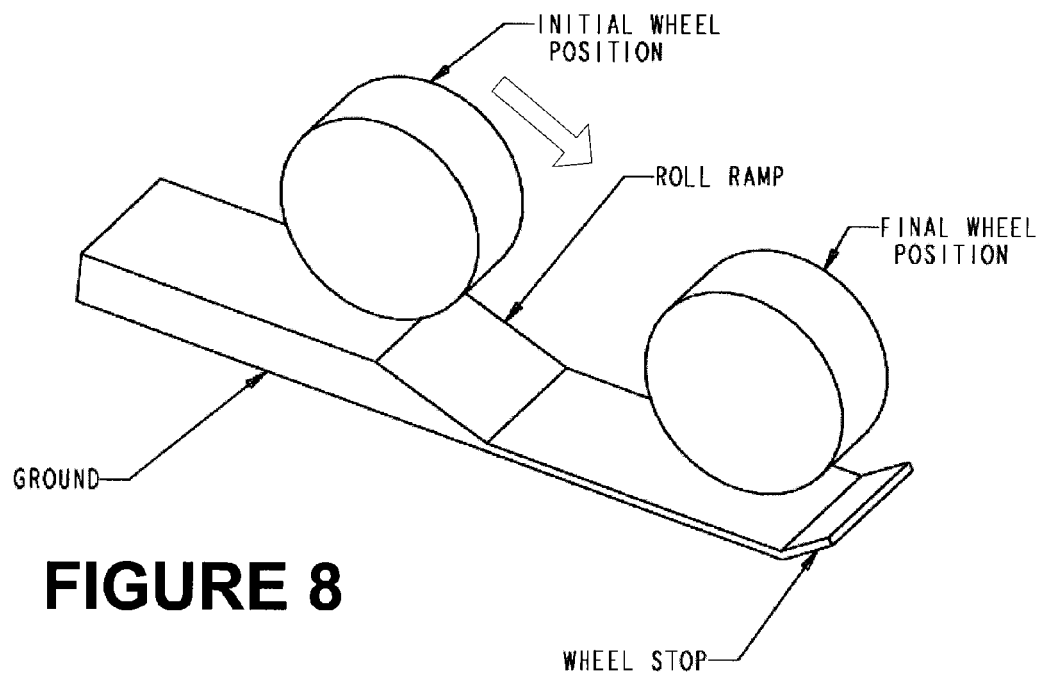
FIG. 8 is a simplified perspective illustration of a descending ramp and wheel stop embodiment of the present disclosure for gravity-assisted rolling movement of a vehicle.
Figure 9:
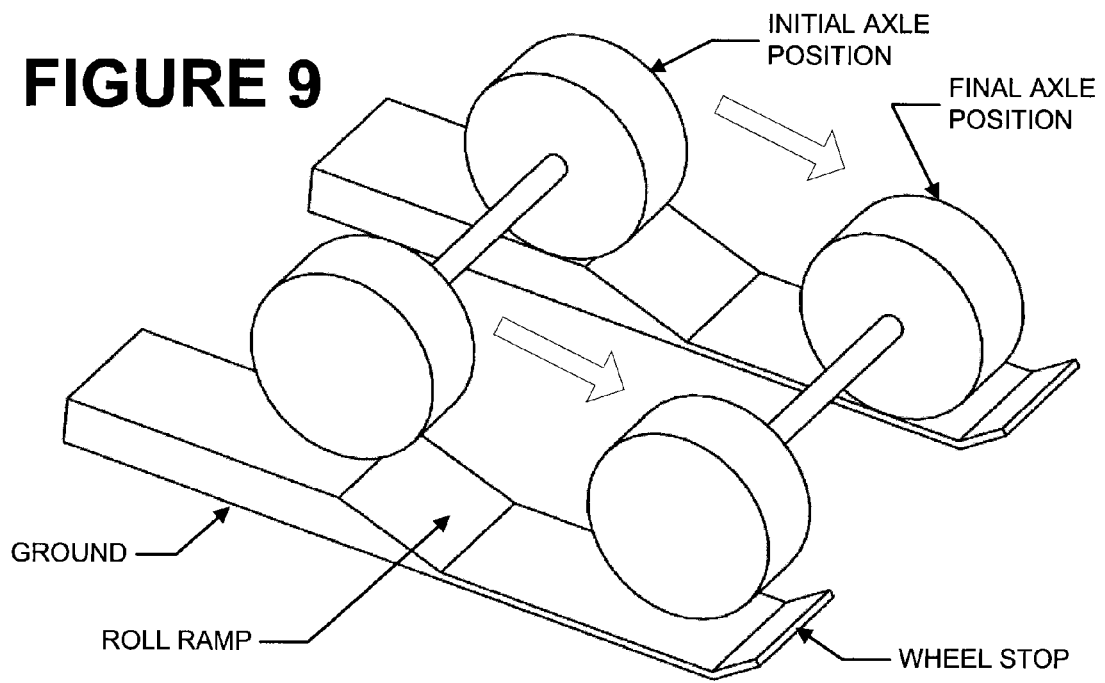
FIG. 9 is a simplified perspective illustration of a pair of descending ramps of FIG. 8, illustrating gravity-assisted rolling movement of a vehicle axle assembly.

It will further be recognized that the specific mechanical constructions of the lift ramp segment 104 may be varied or modified without departing from the scope of the present disclosure. Indeed, as seen in FIG. 8 and FIG. 9, a fundamental concept of the present disclosure, i.e., the imparting of gravity-assisted rolling movement to a vehicle as part of vehicle wheel alignment measurement or correction procedure need not be done by mechanical elevation of a lift ramp segment at all. Rather, in an embodiment particularly suitable for heavy vehicles and/or trucks, the vehicle is initially position on a solid support surface, at the top of a descending roll ramp segment. The sensors or optical targets are secured to the vehicle wheels in the customary manner. When it is necessary to roll the vehicle forward for compensation and/or measurement procedures, the associated vehicle service system provides a suitable indication to the service technician or operator, who gently pushes the vehicle forward onto the descending roll ramp segment. Alternatively, an actuating mechanism could initiate the roll. Once the vehicle wheels cross onto the descending roll ramp segments, the force of gravity will maintain the rolling movement of the vehicle as it descends down the ramp segment, and comes to rest at a final position adjacent a wheel stop or bumper configured to prevent further forward motion. The use of descending roll ramp on a vehicle support structure provides a means by which an operator or service technician can at least partially automate and safely roll a vehicle as required for compensation or service procedures, without being required to exert large pushing forces. Ideally, the length and slope of the descending roll ramp as shown in FIGS. 8 and 9 is selected to impart only the necessary rate of rolling motion and rolling distance to the vehicles with which it is being utilized. To accommodate different weights and/or sized of vehicles, a set of descending roll ramps having different lengths and/or inclinations may be constructed as interchangeable components of the vehicle support structure.

The present disclosure can be embodied in-part in the form of computer-implemented processes and apparatuses for practicing those processes. The present disclosure can also be embodied in-part in the form of computer program code containing instructions embodied in tangible media, such as floppy diskettes, CD-ROMs, hard drives, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for acquiring vehicle wheel alignment measurements in a vehicle wheel alignment service system having a computer configured with a set of vehicle wheel alignment service software instructions, and a vehicle support structure, comprising:

initiating a gravity-induced free rolling movement of the vehicle from a first horizontal rest position on said vehicle support structure, said gravity-induced free rolling movement traversing down a descending roll ramp;

continuing, due to gravity only, said free rolling movement of the vehicle from said first horizontal rest position on said vehicle support structure to a second horizontal rest position on said vehicle support structure;

acquiring, from a set of wheel alignment sensors, data associated with said vehicle free rolling movement, and processing, said acquired data, to identify at least one measurement associated with said vehicle.

2. The method of claim 1 further including the step of utilizing said identified measurement to establish a runout compensation value associated with a wheel of said vehicle.

3. The method of claim 1 wherein said step of initiating said gravity-induced free rolling movement of the vehicle includes imparting an initial impetus to said vehicle to move a wheel of said vehicle from a rest position on said vehicle support structure onto said descending roll ramp.

4. The method of claim 3 where said initial impetus is imparted manually by an operator.

5. The method of claim 3 wherein said initial impetus is imparted automatically by an actuation mechanism in engagement with said vehicle.

6. The method of claim 3 wherein said initial impetus is imparted in response to a signal from said computer.

7. The method of claim 1 further including the step of altering a configuration of said descending roll ramp prior to initiating said gravity-induced free rolling movement to limit at least one characteristic of said gravity-induced free rolling movement of the vehicle, said rolling movement characteristic selected from a set of movement characteristics including vehicle acceleration, vehicle velocity, and vehicle travel distance.

8. The method of claim 1 further including the step of altering a configuration of said descending roll ramp prior to initiating said gravity-induced free rolling movement in response to a weight of said vehicle.

9. The method of claim 1 wherein said set of sensors includes at least one optical target disposed on a wheel of said vehicle and at least one imaging sensor having a field of view encompassing a range of rolling movement of the vehicle, and
wherein said step of acquiring data includes acquiring at least one image of said optical target with said at least one imaging sensor.

10. The vehicle service system of claim 1 wherein said set of sensors includes at least one alignment sensor unit mounted to a wheel of said vehicle, said alignment sensor unit configured to generate a signal representative of data associated with said vehicle wheel.

11. The method of claim 1 further including the step of blocking said vehicle from further free rolling movement at said second horizontal rest position on said vehicle support structure.

12. A method for acquiring vehicle wheel alignment measurements in a vehicle wheel alignment service system having a computer configured with a set of vehicle wheel alignment service software instructions, and a vehicle support structure, comprising:
initiating a gravity-induced rolling movement of the vehicle from a first horizontal rest position on said vehicle support structure to a second horizontal rest position on said vehicle support structure, said gravity-induced rolling movement traversing down a descending roll ramp due only to gravity;
acquiring, from a set of wheel alignment sensors, data associated with said vehicle rolling movement,
processing, said acquired data, to identify at least one measurement associated with said vehicle; and
wherein said first horizontal rest position and said second horizontal rest position are co-planar.

* * * * *